3,507,960
ANTI-ANXIETY COMPOSITIONS AND A METHOD OF PRODUCING ANTI-ANXIETY ACTIVITY WITH COMBINATIONS OF AMOBARBITAL AND TRIFLUOPERAZINE

Leonard Cook, Abington, Pa., and Arnold B. Davidson, Cherry Hill, N.J., assignors to Smith Kline & French Laboratories, Philadelphia, Pa., a corporation of Pennsylvania
No Drawing. Filed Mar. 20, 1968, Ser. No. 714,418
Int. Cl. A61k 27/00
U.S. Cl. 424—247                                11 Claims

ABSTRACT OF THE DISCLOSURE

Pharmaceutical compositions having enhanced anti-anxiety activity comprising trifluoperazine and amobarbital in a 2:30 ratio and a method of producing anti-anxiety activity.

---

This invention relates to novel pharmaceutical compositions having tranquilizing activity and to a method of relieving anxiety with these compositions. More specifically, this invention relates to pharmaceutical compositions having anti-anxiety activity comprising trifluoperazine, 2 - trifluoromethyl-10[3-(1-methyl-4-piperazinyl)propyl]phenothiazine, and amobarbital, 5-ethyl-5-isoamyl-barbituric acid.

Trifluoperazine is well recognized for its use in the control of anxiety as seen among many patients in office practice. The four symptoms most commonly related to this anxiety are agitation, hyperactivity, motor disturbance and tension. It is also well known that certain mild side effects such as a mild depression are associated with the use of trifluoperazine.

It has been unexpectedly found that combining the widely-used tranquilizing agent, trifluoperazine, with a specific central nervous system depressant, amobarbital, produces an enhanced anti-anxiety or tranquilizing effect, without increasing the depressant potential of the combination. Amobarbital is, of course, well known as a general sedative-hypnotic agent with a pronounced tendency to induce drowsiness.

The combination of trifluoperazine and amobarbital has been demonstrated as having this enhanced anti-anxiety activity without a corresponding increased depressant effect on other concurrently measured non-stressed behavior, as measured in a standard animal pharmacological test procedure. This anti-anxiety activity may be best demonstrated in a modified Geller-Seifter test, Psychopharmacologia, vol. 1, 482–492. In this test procedure rats are subjected to psychological stress wherein conflict is experimentally induced in the rat. Briefly, the test comprises placing the rat in a box having a lever, a feeder, a light and an electrifiable grid floor. In a preliminary training period hungry rats learned to press the lever and receive food. The procedure contains two experimental conditions, stress and non-stress. In the non-stress condition, the rats get fed at irregular intervals when they press the lever. During the stress condition, an electric shock is administered to the rat through the floor after every tenth response, simultaneously with a food pellet.

In summary, conflict behavior is induced in rats by simultaneously rewarding with food and punishing with shock at every tenth lever response. The effect of punishing the rat for working for food under these conditions is a marked suppression of behavior. Test compounds are evaluated in this procedure for their effects of alleviating this punishment-induced suppression.

The combination of trifluoperazine and amobarbital was compared to effects produced by similar doses of trifluoperazine and amobarbital alone. Six rats were studied at each dose level, making a total of 18 rats in this study. In each dose level group each rat received trifluoperazine alone, amobarbital alone, and the combination of the appropriate doses. The order of treatment was systematically randomized, and at least seven days intervened between treatments. The drug components were administered orally with the following results. Table 1 represents the effect of the drugs on the stressed or conflict-punished rats.

TABLE 1.—EFFECT ON STRESSED (CONFLICT-PUNISHED) BEHAVIOR

| Dose (mb./kg., p.o., free base) | | Percent change from pre-drug control | | |
|---|---|---|---|---|
| Stelazine* | Amobarbital | Amorbarbital Alone | Stelazine* Alone | 2:30 Combination |
| 0.33 | 5 | +39 | +36 | +112 |
| 0.66 | 10 | +70 | −3 | +249 |

*Stelazine is the trademark for trifluoperazine dihydro-chloride.

The above results indicate that the drug combination significantly alleviated suppression produced by a conflict-punishment situation in rats. This anti-anxiety effect was produced at all doses of the combination tested, in fact, even at a dose where trifluoperazine alone produced no effect. It has also been found that at appropriate treatment dose levels, the anti-anxiety effect of the combination was significantly greater than that of amobarbital alone or trifluoperazine alone.

Table 2 represents the average percent change of responses for each group in the non-stressed or simple food motivated behavior, i.e., no punishing shock.

EFFECT ON NON-STRESSED BEHAVIOR

| Dose (mg/kg, p.o., free base) | | Percent change from pre-drug control | | |
|---|---|---|---|---|
| Stelazine | Amobarbital | Amobarbital Alone | Stelazine Alone | 2:30 Combination |
| 0.33 | 5 | +22 | −14 | +3 |
| 0.66 | 10 | +9 | −22 | −14 |

These results of the non-stressed condition comparing the effects of the combination to those of amobarbital and trifluoperazine alone show that the decrease of responding produced by the combination was no different than that produced by trifluoperazine alone at any of the dose levels tested. This indicates that the depressant effect of trifluoperazine on non-stressed behavior was not increased by amobarbital.

In summary, the above standard pharmacological animal test procedure demonstrates that at appropriate treatment dose levels a combination of trifluoperazine with amobarbital, in a 2 to 30 ratio, produces a greatly enhanced anti-anxiety effect, compared to that of the individual components. However, particularly significant in these test results is that they further demonstrated that the combination was no more depressant on non-stressed behavior than trifluoperazine alone.

The test results described above in standard test procedures in laboratory animals were confirmed in clinical tests in 345 patients in need of tranquilization, i.e., in psychoneurotic outpatients, reported by 17 individual clinicians.

The compositions of this invention are in dosage unit form and comprise a nontoxic pharmaceutical carrier and trifluoperazine or a nontoxic acid addition salt thereof and amobarbital in a 2:30 ratio and in an amount sufficient to control anxiety. Preferably the composition will contain the trifluoperazine in an amount of from about 0.5 mg. to about 5 mg. and the amobarbital in an amount of from about 7.5 mg. to about 75 mg. per dosage unit. Advantageously, the compositions will contain the trifluoperazine in an amount of from about 1.0 mg. to about 3.0 mg. and the amobarbital in an amount of from about 15.0 mg. to about 45.0 mg. per dosage unit. Most advantageously, the compositions of this invention will contain 2 mg. of trifluoperazine and 30 mg. of amobarbital. The quantities outlined herein are based on the active portions of the respective medicaments, i.e., trifluoperazine as the base.

A pharmaceutically acceptable simple organic or preferably inorganic acid addition salt of trifluoperazine may be used instead of the base. Preferably, the hydrochloride salt form is used. However, other salts such as those derived from maleic, sulfuric, phosphoric, succinic, methanesulfonic, ethanedisulfonic, acetic, citric and like non-toxic acids known of use in the art may be used. Such salts are easily prepared by methods known to the art. The base is reacted with either a stoichiometric amount of the desired organic or inorganic acid in an aqueous miscible solvent, such as ethanol or acetone, with isolation of the salt by concentration and cooling or an excess of the acid in an aqueous immiscible solvent such as ethyl ether or chloroform with the desired salt separating directly.

Further, the amobarbital may be present in the form of its sodium, or potassium salt. The combination which is the basis of this invention necessarily contains the trifluoperazine and amobarbital as discrete medicinal entities.

The pharmaceutical carrier employed may be, for example, either a solid or liquid. Exemplary of solid carriers are lactose, terra alba, sucrose, talc, gelatin, agar, pectin, sugar seeds, acacia, magnesium stearate, stearic acid and the like. Exemplary of liquid carriers are syrup, peanut oil, olive oil, water and the like. Similarly the carrier or diluent may include any time delay material well known to the art, such as, for example, glyceryl monostearate or glyceryl distearate alone or with a wax.

A wide variety of pharmaceutical forms can be employed. Thus, if a solid carrier is used the preparation can be tableted, placed in a hard gelatin capsule in powder or sustained release pellet form or in the form of a troche or lozenge. The amount of solid carrier will vary widely but preferably will be from about 25 mg. to about 1 gm. If a liquid carrier is used, the preparation will be in the form of a syrup, emulsion, soft gelatin capsule, sterile injectable liquid such as an ampule or an aqueous or non-aqueous liquid suspension.

The method in accordance with this invention comprises administering internally to animals, preferably humans, in an amount sufficient to relieve anxiety a composition comprising trifluoperazine or nontoxic acid addition salts thereof combined with amobarbital in a 2:30 ratio. The trifluoperazine ingredient and the amobarbital ingredient will be present in dosage unit form in an amount of about 0.5 mg. to about 5.0 mg. of the trifluoperazine and from about 7.5 mg. to about 75 mg. of the amobarbital. Preferably the trifluoperazine will be present from about 1.0 mg. to about 3.0 mg. and the amobarbital will be present from about 15.0 mg. to about 45.0 mg. per unit dose. Most advantageously, the dosage unit administered will contain 2 mg. of trifluoperazine and 30 mg. of amobarbital. The administration may be parenterally or orally, the latter being the preferable route of administration. Advantageously, equal doses will be administered one to three times daily. Preferably, the daily dosage will be from 0.5 mg. to about 15.0 mg. of the trifluoperazine and from about 7.5 mg. to about 225 mg. of the amobarbital. Advantageously, the daily dose will be from about 1.0 mg. to about 9 mg. of trifluoperazine and from about 15.0 to about 135 mg. of the amobarbital. Most advantageously, a daily dose of 2 mg. of trifluoperazine and 30 mg. of amobarbital is administered in sustained release form. All the doses of the combination of this invention are based on the treatment of humans in need of tranquilization.

When the method of administration described above is carried out using the novel combination of ingredients, the anti-anxiety effect of trifluoperazine is enhanced without a concomitant increase of depressant side effects.

The following examples are not limiting but are illustrative of the pharmaceutical compositions and methods of this invention. Other variations of this invention will be obvious to those skilled in the art.

EXAMPLE 1

Trifluoperazine pellets 2.4 kg. of non-pareil seeds (sugar pellets) are placed in a coating pan and the pan is set in motion. The seeds are evenly wetted by spraying them with 2.4 liters of an alcoholic gelatin solution. When the seeds become tacky, sufficient coating powder comprising equal portions of starch and confectioner's sugar is applied to cover the pellets. The pellets are allowed to roll with the application of cold air until they are dry. A final spray of alcoholic gelatin solution is applied to the pellets in order to prevent excessive dusting during the remainder of the operation. A coating solution containing 648 gms. of trifluoperazine dihydrochloride in 1.9 liters of alcoholic gelatin is then evenly sprayed on the pellets. The pellets are dried and then sprayed with a wax-fat coating solution comprising 250 grams. of glyceryl monostearate and 27 gms. of white wax in 865 ml. of carbon tetrachloride. This provides a sealing coat and does not result in sustained release of the pellets.

Amobarbital pellets 70.5 kg. of non-pareil seeds (sugar pellets are placed in a coating pan and the pan is set in motion. The seeds are evenly wetted by spraying them with 20 liters of an alcoholic gelatin solution. When the pellets become tacky, sufficient amobarbital coating powder is applied to cover the pellets. The pellets are then allowed to dry with the application of cold air. This procedure is continued until all the amobarbital coating powder which contains 26.5 kg. of amobarbital mixed with 2.9 kg. of starch is used. One coat of alcoholic gelatin solution is then applied and the pellets are permitted to roll and dry. Sufficient wax-fat solution containing a 90:10 ratio of glyceryl monostearate to white wax in carbon tetrachloride is sprayed on the dry pellets to provide a sealing coat, i.e., a non-sustained release group. These are labeled group 1 amobarbital pellets and approximately 25% of these are set aside. Another 25% of the remaining pellets are placed in a coating pan and further sprayed with an adidtional amount of wax-fat coating to give a desired sustained release pattern.

Using the releases of the sustained release group as a guide, the sustained release and non-sustained release groups are blended to meet release specifications and provide 30 mg. of amobarbital per capsule. Trifluoperazine pellets were added to give a final assay of 2 mg. per capsule.

No. 2 hard gelatin capsules are then filled with the mixed pellets to provide a total dosage of 2 mg. of trifluoperazine and 30 mg. of amobarbital per capsule. One capsule is administered daily.

EXAMPLE 2

| Ingredients: | Mg./tablet |
|---|---|
| Trifluoperazine dihydrochloride | 1.0 |
| Amobarbital | 15.0 |
| Calcium sulfate dihydrate | 115 |
| Sucrose | 25 |
| Starch | 15 |
| Talc | 5 |
| Stearic acid | 3 |

The sucrose, calcium sulfate, amobarbital and trifluoperazine dihydrochloride are thoroughly mixed and granulated with hot 10% gelatin solution. The wetted mass is passed through a #6 mesh screen directly onto drying trays. The granules are dried at 120° F. and passed through a #20 mesh screen. These granules are then mixed with the starch, talc and stearic acid, passed through a #60 mesh screen and then compressed into tablets.

One tablet is administered twice a day.

EXAMPLE 3

| Ingredients: | Mg./capsule |
|---|---|
| Trifluoperazine | 0.5 |
| Amobarbital | 7.5 |
| Magnesium stearate | 2.0 |
| Lactose | 250.0 |

The ingredients are mixed and filled into a #2 hard gelatin capsule.

One capsule is administered three times a day.

EXAMPLE 4

| Ingredients: | Mg./capsule |
|---|---|
| Trifluoperazine maleate | 5.0 |
| Amobarbital | 75.0 |
| Lactose | 250.0 |

The ingredients are mixed and filled into a #2 hard gelatin capsule.

One capsule is administered daily.

EXAMPLE 5

| Ingredients: | Amount | |
|---|---|---|
| Trifluoperazine sulfate | mg | 20.0 |
| Sodium amobarbital | mg | 300.0 |
| Soluble saccharin | gm | 0.10 |
| Sodium benzoate | gm | 0.05 |
| Citric acid | gm | 0.02 |
| Ascorbic acid | gm | 0.10 |
| Oil of orange | ml | 0.01 |
| Oil of custard flavor | ml | 0.05 |
| Sugar syrup | ml | 90.00 |
| Distilled water, q.s. to 100.00 ml. | | |

Dissolve the trifluoperazine sulfate, sodium amobarbital, soluble saccharin, sodium benzoate, citric acid and ascorbic acid in the distilled water, add the sugar syrup, stir and filter. The oil of orange and oil of custard flavor are then added and the mixture thoroughly stirred.

One teaspoonful is administered orally three times a day.

What is claimed is:

1. A pharmaceutical composition having enhanced anti-anxiety activity in dosage unit form for the treatment of psychoneurotic patients comprising trifluoperazine and amobarbital in a 2:30 ratio.

2. The composition of claim 1 wherein the dosage unit form comprises from about 0.5 mg. to about 5.0 mg. of trifluoperazine and from about 7.5 mg. to about 75 mg. of amobarbital.

3. The composition of claim 1 wherein the dosage unit form comprises 2 mg. of trifluoperazine and 30 mg. of amobarbital.

4. The composition of claim 3 in which the trifluoperazine is in the form of the dihydrochloride.

5. The composition of claim 3 wherein the dosage unit form is a tablet or capsule.

6. The composition of claim 3 wherein the dosage unit form is a hard gelatin capsule and contains the amobarbital in the form of sustained release pellets.

7. The method of producing anti-anxiety activity in humans which comprises administering internally to psychoneurotic subjects in an amount sufficient to relieve anxiety without substantial depression a combination of trifluoperazine and amobarbital in a 2:30 ratio.

8. The method according to claim 7 wherein the route of administration is oral.

9. The method according to claim 7 wherein a dosage unit of from about 0.5 mg. to about 5.0 mg. of trifluoperazine and from about 7.5 mg. to about 75 mg. of amobarbital is internally administered to psychoneurotic subjects one to three times daily.

10. The method according to claim 7 wherein a dosage unit containing 2 mg. of trifluoperazine combined with 30 mg. of amobarbital in sustained release form is administered once a day.

11. The method according to claim 10 in which the dihydrochloride form of trifluoperazine is used.

References Cited

UNITED STATES PATENTS 2,928,767  3/1960  Gulesich.

OTHER REFERENCES

Drug & Cosmetic Industry, vol. 96, No. 4, p. 558.

ALBERT T. MEYERS, Primary Examiner

S. J. FRIEDMAN, Assistant Examiner

U.S. Cl. X.R.

424—254